United States Patent [19]
Eichenhofer

[11] 3,760,661
[45] Sept. 25, 1973

[54] PNEUMATIC BAR FEEDER CONTROL FOR MULTIPLE SPINDLE SCREW MACHINES

[75] Inventor: Josef Eichenhofer, Brampton, Ontario, Canada

[73] Assignee: Automatic Bar Feed Ltd., Ontario, Canada

[22] Filed: Aug. 13, 1971

[21] Appl. No.: 171,447

[52] U.S. Cl. ................................................. 82/2.7
[51] Int. Cl. .......................................... B23b 13/00
[58] Field of Search ............................. 82/2.4, 2.7; 214/1.3, 1.2

[56] References Cited
UNITED STATES PATENTS

| | | | |
|---|---|---|---|
| 3,372,449 | 3/1968 | Jamison | 82/2.7 |
| 2,746,128 | 5/1956 | Barron et al. | 82/2.7 X |
| 3,095,130 | 6/1963 | Schultz | 82/2.7 |
| 3,209,627 | 10/1965 | Holmes | 82/2.7 |

*Primary Examiner*—Andrew R. Juhasz
*Assistant Examiner*—Leon Gilden
*Attorney*—George W. Shaw et al.

[57] ABSTRACT

A pneumatic system controls the bar feeding in a multi-spindle screw machine using a drive roller to feed bars. The system includes a pneumatic push back stop controlled by a valve operated by the same cam system that controls the drive roller. The system also includes safety shutoffs for stock depletion and failure to push the stock back completely.

11 Claims, 11 Drawing Figures

INVENTOR.
JOSEF EICHENHOFER
BY Cumpston, Shaw and Stephens
ATTORNEYS

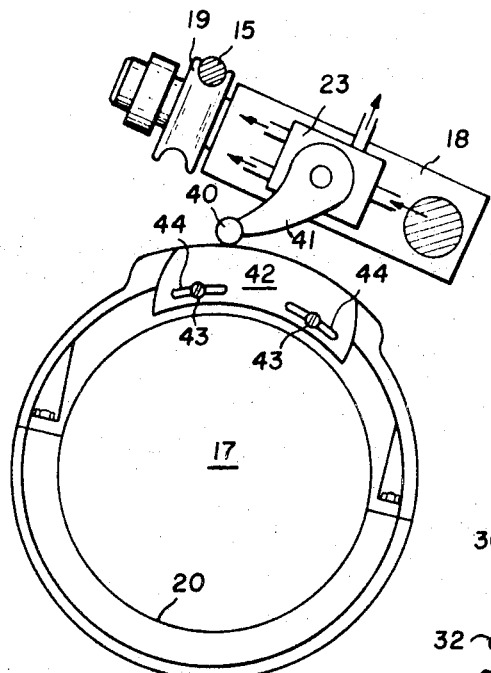
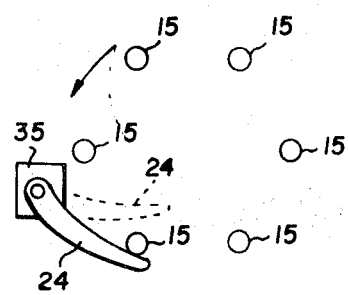
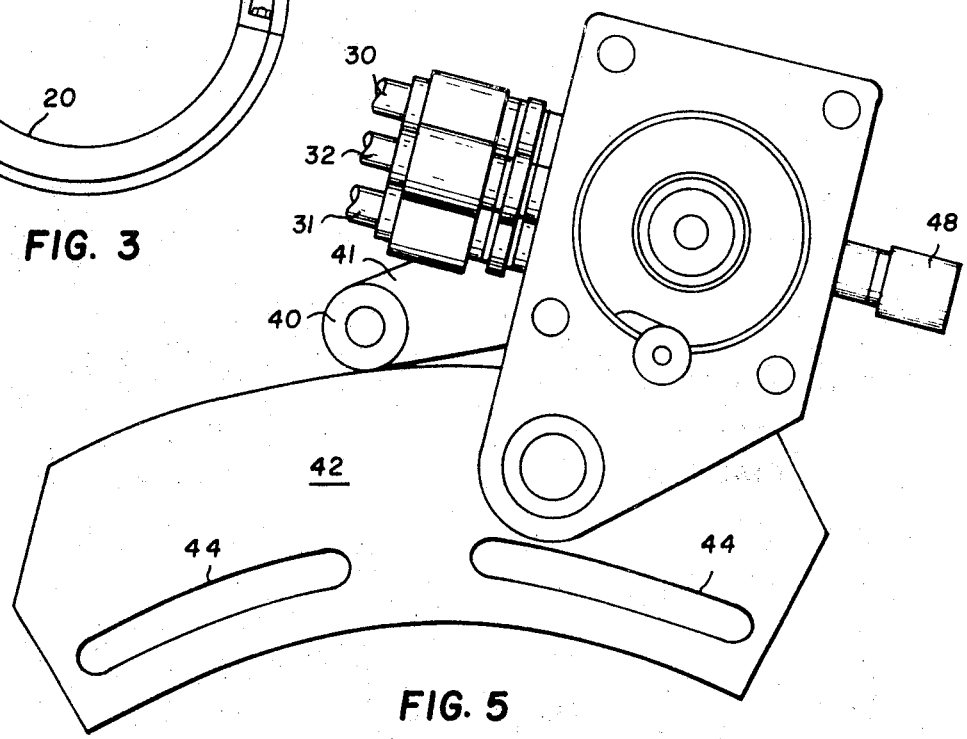
FIG. 3
FIG. 4
FIG. 5

INVENTOR.
JOSEF EICHENHOFER
BY Cumpston, Shaw
and Stephens
ATTORNEYS

PNEUMATIC BAR FEEDER CONTROL FOR MULTIPLE SPINDLE SCREW MACHINES

THE INVENTIVE IMPROVEMENT

Drive roller feeds for multi-spindle screw machines have many advantages over pusher tube feeding, including less marring of stock, greater speed and reliability in feeding, and capacity to feed longer workpiece lengths. Drive roll feeders also make possible automatic bar replenishment by their capacity to drive a succeeding bar through the head stock behind a preceding bar, but this can cause serious mishaps when the preceding bar remnant is only slightly longer than the desired workpiece length. Such a remnant may not be held securely enough in the collet to prevent damage to the collet and tools.

The invention involves recognition of the automatic bar replenishment capacity of a drive roll feeder system, and prevents potential mishaps from such operations. The invention also combines several safety shut-off features with a control system that is simple, reliable, economical, and readily attached to existing screw machines. The invention seeks all these advantages and aims to increase the efficiency and reliability of existing screw machines with minimum expense in equipment and machine modification.

SUMMARY OF THE INVENTION

The invention accomplishes these objects in multi-spindle bar machines that have a drive roller bar feeder moved by a cam system for engaging and advancing a bar during the feed cycle of the machine. The control system includes a stop to be engaged by the bar in an overfeed position, and a pneumatic cylinder for pushing the bar back from the overfeed position to a feed position. The pneumatic cylinder is controlled by an air valve opeated by a cam follower moved by a surface of the cam means for a pre-determined timed relation of the air valve with the movement with the drive roller. The invention also includes safety shutoffs for stock depletion and incomplete pushing back of the bar to the feed position.

DRAWINGS

FIG. 3 is a partially schematic, elevational view of a preferred embodiment of a control valve and cam for use in the inventive system;

FIG. 4 is a partially schematic, elevational view of a preferred embodiment of a stock depletion sensor valve for use in the inventive system;

FIG. 5 is a fragmentary elevational view of a preferred embodiment of a control valve for the inventive system;

DETAILED DESCRIPTION

Figure 1:
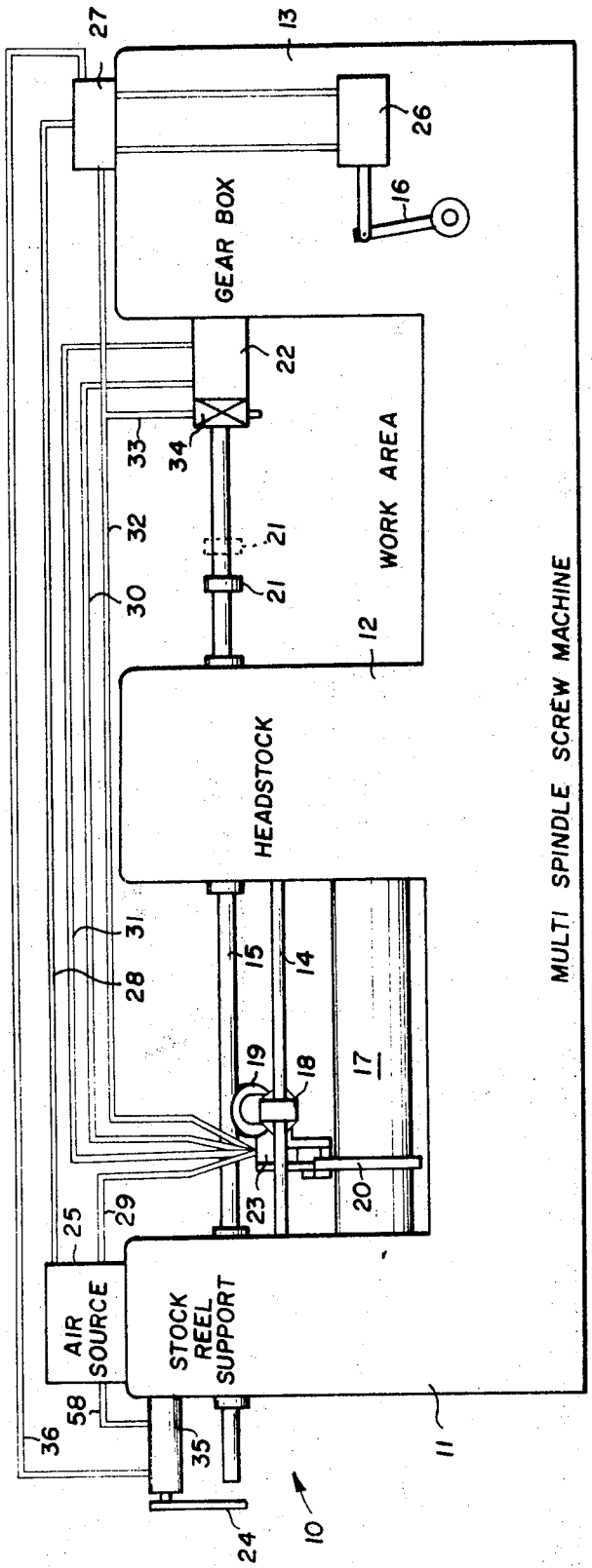
FIG. 1 is a schematic diagram of a preferred embodiment of the inventive control system.

The invention and its operation will first be described relative to machine 10 schematically illustrated in FIG. 1, and then the specific components of the inventive system will be described.

Machine 10 is a known, multi-spindle screw machine having a stock reel support 11, a head stock 12, and a gear box 13. A plurality of bars are successively fed through stock reel support 11 and head stock 12, but for simplicity, only one of such bars 15 is shown in FIG. 10. Machine 10 also includes a lever 16 for disengaging the main drive clutch, and a cam drum 17 for controlling the feeding of stock. A stock reel (not shown) indexes to advance each bar 15 to a new position, and at the feed position of the machine where bar 15 is illustrated, bar 15 is pushed through the head stock a pre-determined length to establish a new workpiece extending into the work area of the machine.

Many existing screw machines use pusher tubes controlled by cam drum 17 for feeding bar 15, but in the inventive system, the pusher tubes are removed from machine 10 and a bar feeder 18 is mounted for rocking motion on shaft 14 and carries a driven drive roller 19 used to feed bar 15. A cam 20 fastened to cam drum 17 moves bar feeder 18 upward during the feed cycle to force drive roller 19 against bar 15 for advancing bar 15 through head stock 12. After the feed cycle, cam 20 lowers bar feeder 18 to move drive roller 19 away from bar 15 during the machining cycle.

These operations are repeated cyclically by machine 10 until bar 15 is consumed. Drive roller 19, unlike pusher tube feeders, is capable of driving a succeeding bar through headstock 12 behind a preceding bar 15 for complete consumption of each bar. Eventually, however, a final bar remnant will be only slightly longer than a desired workpiece so that the collet will have an insufficient grip on the trailing end of the remnant. This can damage the gripping surface of the collet, and tools pressing against the remnant may move it off axis to cause substantial damage to the machine. The inventive control system prevents this sort of mishap partially by means of a push-back stop, and partially through safety shutoff devices as described below.

A stop 21 is arranged axially of bar 15 beyond head stock 12 and is normally maintained in the broken-line position illustrated in FIG. 1 where it will be engaged by bar 15 only after bar 15 has been overfed an inch or so beyond the length desired for the actual workpiece. A pneumatic cylinder 22 coaxial with stop 21 and bar 15 pushes stop 21 back against bar 15 to force bar 15 back to a feed postion shown in solid lines in FIG. 10 where bar 15 extends beyond its collet by precisely the desired workpiece length. The pushing back ensures that the remnant end of bar 15 is securely held in its collet, because a shorter than adequate remnant will not bridge the gap between head stock 12 and the overfeed position of stop 21 and will be dropped from the machine as waste.

Pneumatic cylinder 22 is controlled by an air valve 23 secured to bar feeder 18 and operated by a porton of cam 20 so that the push back of pneumatuc cylinder 22 is precisely timed to the feeding of bar 15 by drive roller 19. Air valve 23 also participates in a safety shutoff that operates if stop 21 does not push bar 15 all the way back to the feed position.

If the operator or associated equipment fails to put a succeeding bar in place behind bar 15 for automatic bar replenishment, it is desirable to shut down machine 10. This is accomplished in the inventive system by a sensor arm 24 that engages and detects the presence of bar 15 and operates if not bar 15 is present in the region of sensor arm 24 when the stock reel indexes. A suitable indicator (not shown) informs the operator of a stock depletion shutdown, and he replenishes the supply of bars 15 and resumes operation.

A supply 25 of air under pressure powers the pneumatic control equipment of the inventive system. The preferred equipment for shutting off machine 10 includes a pneumatic shutoff device 26 that operates clutch lever 16 to disengage the main machine drive, and a trigger valve 27 controlling shutoff device 26. Source 25 supplies air through line 28 to trigger valve 27 for powering shutoff device 26, and also supplies air through line 29 to control valve 23. The output lines from air valve 23 include line 30 for maintaining stop 21 in its retracted, broken-line position, and line 31 for pushing stop 21 to force bar 15 back to the feed position.

Air valve 23 also directs air through line 32 to trigger valve 27, and a branch line 33 leads from line 32 to a valve 34 in cylinder 22. Valve 34 is closed until cylinder 22 bottoms to push stop 21 all the way back to the feed position. This opens valve 34 to bleed air out of lines 32 and 33 and prevent actuation of trigger valve 27. Otherwise, if valve 34 fails to open, indicating an incomplete pushback of bar 15, pressure builds up sufficiently in line 32 to operate trigger valve 27 and shut down the machine. This is desirable to prevent any overlength workpieces that would damage the machine.

Air from source 25 is also fed to a valve 35 operated by sensor arm 24 to direct air through line 36 to trigger valve 27 whenever sensor arm 24 actuates. This shuts down the machine for insufficient stock.

Figure 2:
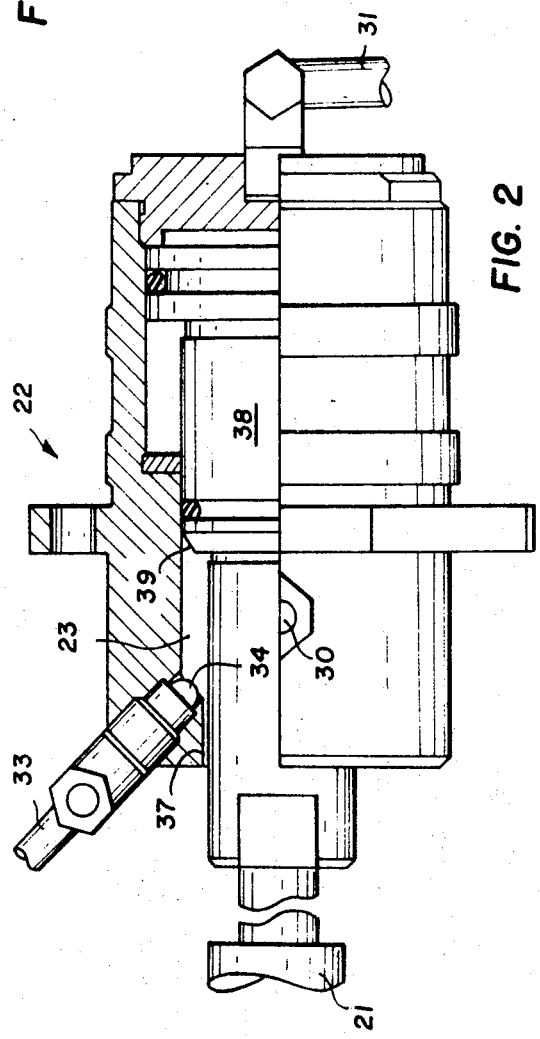
FIG. 2 is a partially schematic, partially cut-away, elevational view of a preferred embodiment of a push-back stop for use in the inventive system.
Figure 6:
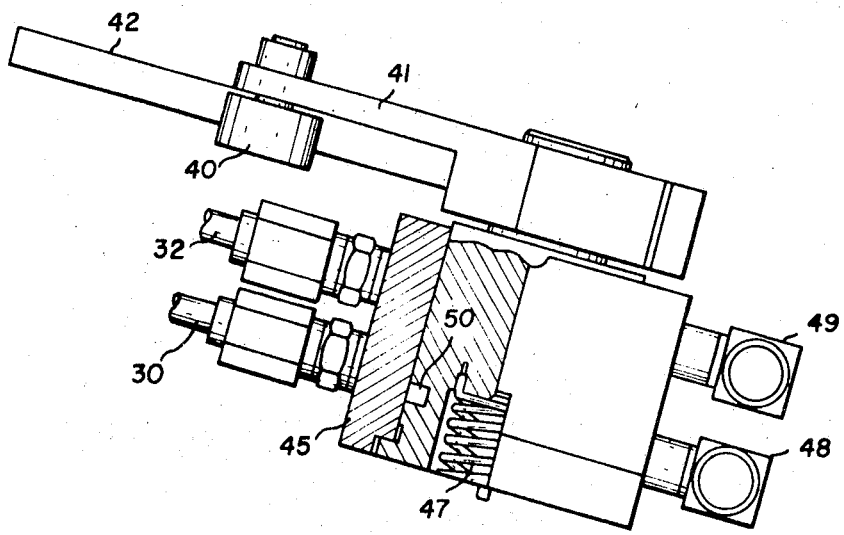
FIG. 6 is a partially cut-away plan view of the control valve of FIG. 5.

Push back stop 21 and its pneumatic cylinder 22 are illustrated more completely in FIG. 2. Stop 21 is adjustable axially of cylinder 22 to the desired overfeed position for a bar, and cylinder 22 is preferably shaped for mounting in the end-working tool holder for the feed position of machine 10.

A piston 38 in cylinder 22 travels back and forth as indicated by the arrows in response to air from the control valve. Air pressure in line 30 normally holds piston 38 in the retracted position illustrated to maintain stop 21 in the overfeed position. Air pressure in line 31 drives piston 38 to the left while air exhausts through line 30 back to the control valve, and stop 21 moves to the left to push bar 15 back to the feed position as described above. Such pushing back preferably occurs while the drive roller of the bar feeder is still forcing the bar forward to ensure that the bar has a firm contact with stop 21. After the feeding cycle is completed and the bar collet is closed, the control valve operates to reverse the air supply to cylinder 22 so that air pressure in line 30 retracts piston 38 to its illustrated position while air exhausts out line 31.

Bleeder valve 34 is preferably a ball valve arranged at the forward end of cylinder 22 as illustrated, so that surface 39 of piston 38 engages the ball of valve 34 to open valve 34 only when piston 38 has bottomed in a full stroke to push stop 21 all the way back against bar 15. Such opening of valve 34 bleeds off the pressure in branch line 33 through through slot 37 to prevent trigger valve 37 from shutting the machine down. Any partial stroke of cylinder 22 leaving an overly long workpiece will fail to open valve 34 and will let trigger valve 27 shut down the machine before any damage occurs.

Air control valve 23 is shown generally in FIG. 3 and in more detail in FIGS. 5 – 9. As shown in FIG. 3, cam 20 is preferably formed of two, generally semi-cylindrical halves fastened together around cam drum 17. Bar feeder 18 is rocked up and down by cam 20 to press drive roller 19 against bar 15 at the appropriate time in the machine's feed cycle. Valve 23 is secured to the side of feeder 18 as illustrated, and includes a follower 40 on arm 41 for operating the valve. A cam plate 42 is adjustably secured to cam 20 by screws 43 in slots 44 so that cam plate 42 is peripherally adjustable along the high region of cam 20 to adjust the timing of valve 23 relative to movement of drive roller 19. Whenever cam plate 42 raises follower 40 and cam 41 of valve 23, valve 23 operates cylinder 22 for pushing back stop 21 as previously described. The preferred specifics of this operation are best shown in FIGS. 5 – 9.

Control valve 23 includes a body 45 housing a rocking cylinder 46 which is rocked a few rotational degrees by arm 41 and follower 40. Spring 47 biases cylinder 46 and arm 41 downward into engagement with cam plate 42.

Air from source 25 enters valve body 45 through two inlets 48 and 49, and cylinder 46 controls the outlet of such air to lines 30 – 32. As previously described, outlet 30 leads to cylinder 22 to hold stop 21 in a retracted, overfeed position, line 31 leads to cylinder 22 to push stop 21 back to a feed position, and line 32 leads to trigger valve 27.

Figure 8A:
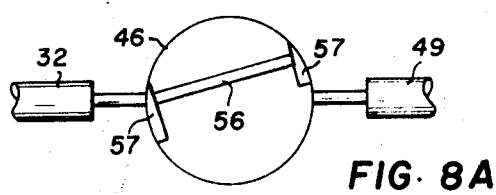
FIGS. 8a and 8b are cross sectional views of the air valve of FIG. 6 taken along the line 8 — 8 thereof, and showing two operating positions of such valve.
Figure 8B:
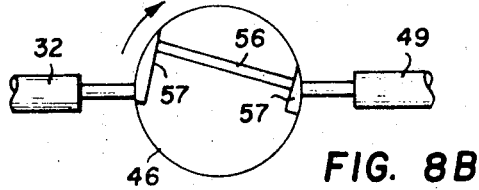
Figure 9:
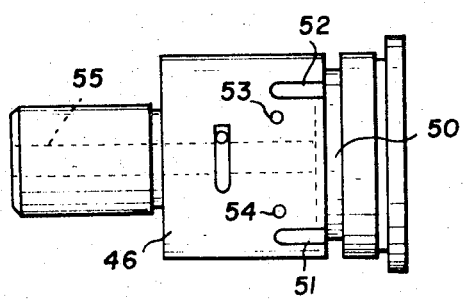
FIG. 9 is an elevational view of a control cylinder for the air valve of FIG. 5.

The internal operation of control valve 23 is best shown in FIGS. 7 – 9. Cylinder 46 has an annular groove 50 registered with inlet 48. Axial grooves 51 and 52 communicate with annular groove 50 and bores 53 and 54 lead to an axial exhaust bore 55. A cross bore 56 extends through cylinder 46 on a cord lying in the plane of inlet 49 and outlet 32, and channels 57 communicate with the ends of bore 56.

Figure 7A:
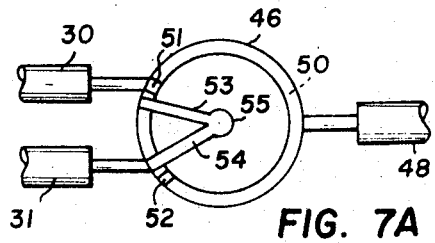
FIGS. 7a and 7b are cross sectional views of the air valve of FIG. 6 taken along the line 7 — 7 thereof, and showing two operating positions of such valve.

Air from inlet 48 pressurizes annular groove 50 and communicating recesses 51 and 52, and cylinder 46 is normally positioned as shown in FIG. 7a so that air is delivered through recess 51 to line 30 for holding stop 21 back in its retracted position. bore 54 communicates with line 31 for exhaust through axial opening 55.

Figure 7B:
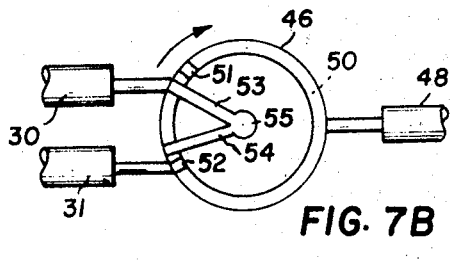

When follower 40 is lifted by cam plate 42, cylinder 46 is rotated to the position shown in FIG. 7b where recess 52 delivers air to line 31 for pushing stop 21 back as previously described. At the same time, bore 53 registers with line 30 for exhaust through passageway 55. When cam plate 42 passes beyond follower 40, cylinder 46 returns to the position shown in FIG. 7a for retracting stop 21 back to its normal position.

The safety shut-off for any incomplete pushing back of stop 21 is also controlled by cylinder 46 as shown in FIGS. 8a and 8b. In the normal position of cylinder 46 as shown in FIG. 8a, air pressure in inlet 49 cannot pass through bore 56 for delivery through output line 32, but when cam plate 42 raises follower 40, cylinder 46 is moved to the position shown in 8b, where air from inlet 49 passes through a recess 57 and bore 56, and out through line 32. Line 32 leads to trigger valve 27 for shutting off the machine, unless the pressure is depleted by opening of valve 34 in cylinder 22 at the end of branch line 33. This occurs only when piston 38 bottoms at the end of a full stroke, signifying a full push-back of stop 21.

Another machine shutoff is accomplished by bar sensor arm 24 as best shown in FIGS. 1 and 4. A line 58 delivers air pressure from source 25 to valve 35 controlled by sensor arm 24 for delivering air through output line 36 to trigger valve 27 for shutting down the machine. Arm 24 normally engages a bar 15, as best shown in FIG. 4, and as the stock reel indexes counterclockwise as viewed in FIG. 4, successive bars 15 move into engagement with arm 24. Whenever any bar 15 is insufficiently consumed so that its trailing end does not extend all the way back to arm 24, arm 24 rotates inward or counterclockwise, as shown in FIG. 4, to operate valve 35 for shutting down the machine. Preferably an indicator (not shown) informs the operator of the reason for the shutdown, and he loads new bars into the stock reel. Arm 24 can also be arranged to operate a electro-mechanical shutoff for machine 10.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, other valving and control equipment can be used in the inventive system, and many variations within the skill of those experienced in the art can be made to adapt the system to different machines. The invention can also be built into new screw machines.

I claim:

1. In a multi-spindle bar machine having a drive roller bar feeder and cam means for moving said drive roller into engagement with a bar to advance said bar during the feed cycle of said machine, the improvement comprising:
   a. a movable stop arranged to be engaged by said bar in an overfeed position of said bar;
   b. a pneumatic cylinder arranged for pushing said stop against the feed direction of said bar for pushing said bar back from said overfeed positon to a feed position;
   c. an air valve arranged for controlling said cylinder;
   d. a cam follower for operating said air valve; and
   e. a surface of said cam means arranged for moving said cam follower for operating said air valve in a pre-determined, timed relation with said movement of said drive roller.

2. The machine of claim 1 wherein said pneumatic cylinder is arranged in the end-working tool position of the feed station of said machine coaxially with said stop and said bar.

3. The machine of claim 1 wherein said drive roller cam means comprises an annular cam fastened to the cam drum of said machine, and including said cam surface.

4. The machine of claim 3 wherein said air valve is secured to the housing of said feeder, and said cam surface is formed by a plate adjustably secured to said annular cam.

5. The machine of claim 1 including a device arranged for disengaging the drive of said machine, a trigger valve for operating said disengaging device, means for directing air from said air valve to said trigger valve, and a bleed valve arranged for bleeding off said directed air to prevent actuation of said trigger valve whenever said stop is pushed all the way to said feed position.

6. The machine of claim 5 wherein said bleed valve is arranged in said pneumatic cylinder to be opened upon a full, push back stroke of said cylinder.

7. The machine of claim 1 including a device for disengaging the drive of said machine, a trigger valve for operating said disengaging device, and a sensor arranged on said machine to sense the presence of said bar at a region where said bar is approaching said drive roller and to actuate said trigger valve for operating said disengaging device whenever no bar presence is sensed.

8. The machine of claim 1 wherein said air valve includes a housing and a control cylinder rocked within said housing to direct air pressure to said pneumatic cylindr for normally maintaining said stop in said overfeed position and for driving said cylinder to move said stop to said feed position when said follower is moved by said cam surface.

9. The machine of claim 8 wherein said control cylinder is configured to permit exhaust from said pneumatic cylinder through said control cylinder.

10. The machine of claim 8 including a device arranged for disengaging the drive of said machine, a trigger valve for operating said disengaging device, said control cylinder and said housing being formed to direct a source of air to said trigger valve when said follower is moved by said cam surface, and a bleed valve arranged in said pneumatic cylinder for bleeding off said air directed to said trigger valve to prevent actuation of said trigger valve whenever said pneumatic cylinder pushes said stop all fhe way to said feed position.

11. The machine of claim 10 including a sensor arranged on said machine to sense the presence of said bar at a region where said bar is approaching said drive roller and to actuate said trigger valve for operating said disengaging device whenever no bar presence is sensed.

* * * * *